US008215930B2

(12) United States Patent
Burden et al.

(10) Patent No.: US 8,215,930 B2
(45) Date of Patent: Jul. 10, 2012

(54) DIAPHRAGM PUMPS AND TRANSPORTING DRAG REDUCERS

(75) Inventors: Timothy L. Burden, Ponca City, OK (US); Dung H. Nguyen, Katy, TX (US); Richard D. Thomas, Ponca City, OK (US)

(73) Assignee: Phillips 66 Company, Houston, TX (US)

( * ) Notice: Subject to any disclaimer, the term of this patent is extended or adjusted under 35 U.S.C. 154(b) by 385 days.

(21) Appl. No.: 12/261,325

(22) Filed: Oct. 30, 2008

(65) Prior Publication Data

US 2010/0111714 A1 May 6, 2010

(51) Int. Cl.
*F04B 45/04* (2006.01)
*F01B 19/02* (2006.01)
*F16J 3/02* (2006.01)

(52) U.S. Cl. ........................................ 417/413.1; 92/102

(58) Field of Classification Search .................. 417/395, 417/413.1, 413.2, 394, 412, 413.3, 481; 92/98 R, 92/102

See application file for complete search history.

(56) References Cited

U.S. PATENT DOCUMENTS

| | | | | |
|---|---|---|---|---|
| 2,371,632 | A * | 3/1945 | Lippincott | 138/30 |
| 2,753,804 | A | 7/1956 | Goss et al. | |
| 3,276,389 | A | 10/1966 | Bower | |
| 3,338,171 | A | 8/1967 | Conklin | |
| 3,468,261 | A * | 9/1969 | Schmierer | 417/567 |
| 4,378,201 | A * | 3/1983 | Quarve | 417/388 |
| 5,306,122 | A | 4/1994 | Gebauer et al. | |
| 261,423 | A1 | 11/2005 | Funkhauser et al. | |
| 7,540,197 | B2 * | 6/2009 | Wavering et al. | 73/715 |
| 2006/0056999 | A1 * | 3/2006 | East | 417/413.2 |
| 2006/0148928 | A1 * | 7/2006 | Harris et al. | 523/175 |
| 2007/0243084 | A1 * | 10/2007 | Vogeley | 417/413.2 |
| 2008/0141780 | A1 * | 6/2008 | Wavering et al. | 73/723 |

* cited by examiner

*Primary Examiner* — Devon Kramer
*Assistant Examiner* — Bryan Lettman
(74) *Attorney, Agent, or Firm* — Phillips 66 Company

(57) ABSTRACT

An apparatus for a diaphragm pump and a method for transporting at least a portion of a latex and/or a latex drag reducer through a diaphragm pump are disclosed. A method for reducing the pressure drop associated with flowing a hydrocarbon-containing fluid through a pipeline also is disclosed.

16 Claims, 4 Drawing Sheets

DIAPHRAGM PUMPS AND TRANSPORTING DRAG REDUCERS

BACKGROUND OF THE INVENTION

1. Field of the Invention

The invention relates to an improved pump and process for pumping latexes or latex drag reducing agents, also referred to as drag reducing additives or flow improvers. More particularly, the invention relates to diaphragm pumps, a method to transport a latex drag reducer, and a method to reduce the pressure drop associated with flowing a hydrocarbon-containing fluid through a pipeline.

2. Description of the Prior Art

When fluids are transported by a pipeline, a drop in fluid pressure typically occurs due to friction between the wall of the pipeline and the fluid. Due to this pressure drop, for a given pipeline, fluid must be transported with sufficient pressure to achieve a desired throughput. When higher flow rates are desired through the pipeline, more pressure must be applied due to the fact that as flow rates are increased the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducing additives in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of fluid through a pipeline. The role of these additives is to suppress the growth of turbulent eddies, which results in higher flow rate at a constant pumping pressure. Ultra-high molecular weight polymers are known to function well as drag reducers, particularly in hydrocarbon liquids. In general, drag reduction depends in part upon the molecular weight of the polymer additive and its ability to dissolve in the hydrocarbon under turbulent flow. It has been found that effective drag reduction can be achieved by employing drag reducing polymers having number average molecular weights in excess of five million. However, despite these advances in the field of drag reducing polymers, a need still exists for improved drag reducers.

As improved drag reducers are developed, the pumps available to pump the drag reducers into pipelines cannot always effectively pump drag reducers and maintain pump pressure. The pumps can become plugged with drag reducer or other components and valuable time is spent to open, clean and maintain the pumps. There is a need for reliable pumps to maintain a steady and/or constant flow of drag reducers into a pipeline.

SUMMARY OF THE INVENTION

In accordance with this invention, an apparatus for a diaphragm pump is provided which comprises (a) a diaphragm having a pump side and an actuation side; (b) a pump head circumferentially coupled to said pump side of said diaphragm thereby defining an angle of intersection along the resulting circumferential interface; (c) a pumping chamber defined by said pump head and said pump side of said diaphragm; and (d) at least one barrier material disposed within said pumping chamber, wherein during operation of said diaphragm pump, said diaphragm is caused to oscillate between a suction stroke position and a discharge stroke position thereby causing a process fluid to flow through said pumping chamber, wherein said oscillation further causes the angle of intersection along said circumferential interface to expand and contract, and wherein said barrier material substantially prevents said process fluid from contacting said circumferential interface during said expansion.

In accordance another embodiment of this invention, a method for transporting a latex is provided which comprises pumping at least a portion of said latex through a diaphragm pump, said diaphragm pump comprising (a) a diaphragm having a pump side and an actuation side; and (b) a pump head circumferentially coupled to said pump side of said diaphragm, thereby defining a pumping chamber, wherein said pumping comprises causing said diaphragm to oscillate between a suction stroke position and a discharge stroke position thereby causing at least a portion of said latex to flow through said pumping chamber, wherein said latex is prevented from contacting at least 50 percent of the circumferential interface between said pump side of said diaphragm and said pump head by at least one barrier material. As used herein, a latex is defined as a plurality of polymer particles dispersed in a continuous liquid phase, wherein the particles have a mean diameter of less than about 10 micrometers, or more typically less than 1 micrometer.

In accordance with another embodiment of this invention, a method for transporting a latex drag reducer is provided which comprises pumping at least a portion of said latex drag reducer through a diaphragm pump, said diaphragm pump comprising (a) a diaphragm having a pump side and an actuation side; and (b) a pump head circumferentially coupled to said pump side of said diaphragm, thereby defining a pumping chamber, wherein said pumping comprises causing said diaphragm to oscillate between a suction stroke position and a discharge stroke position thereby causing at least a portion of said latex drag reducer to flow through said pumping chamber, wherein said latex drag reducer is prevented from contacting at least 50 percent of the circumferential interface between said pump side of said diaphragm and said pump head by at least one barrier material.

In accordance with still another embodiment of this invention, a method is provided for reducing the pressure drop associated with flowing a hydrocarbon-containing fluid through a pipeline, said process comprising (a) preparing a latex drag reducer via emulsion polymerization; and (b) pumping at least a portion of said latex drag reducer into said hydrocarbon-containing fluid via a diaphragm pump, said diaphragm pump comprising 1) a diaphragm having a pump side and an actuation side; and 2) a pump head circumferentially coupled to said pump side of said diaphragm, thereby defining a pumping chamber, wherein said pumping comprises causing said diaphragm to oscillate between a suction stroke position and a discharge stroke position thereby causing at least a portion of said latex drag reducer to flow through said pumping chamber, wherein said latex drag reducer is prevented from contacting at least 50 percent of the circumferential interface between said pump side of said diaphragm and said pump head by at least one barrier material.

BRIEF DESCRIPTION OF THE DRAWINGS AND FIGURES

DETAILED DESCRIPTION OF THE INVENTION

The following detailed description of various embodiments of the invention references the accompanying drawings which illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Improved drag reducers useful in this invention are those wherein all or at least a portion of said drag reducer is a latex drag reducer. Exemplary latex drag reducers can comprise a drag reducing composition (i.e., a drag reducer) comprising a carrier fluid and a plurality of particles comprising a polymer. Preferably, the polymer has a weight average molecular weight of at least $1\times10^6$ g/mol, more preferably about $5\times10^6$ g/mol, and most preferably $6\times10^6$ g/mol.

Other exemplary drag reducers useful in this invention can be a composition comprising: (a) a continuous phase; (b) a plurality of first particles comprising a first drag reducing polymer dispersed in the continuous phase, wherein the first particles have a mean particle size in the range of from about 100 micrometers to about 700 micrometers; and (c) a plurality of second particles comprising a second drag reducing polymer dispersed in the continuous phase, wherein the second particles have a mean particle size of less than about 10 micrometers. Exemplary drag reducer compositions can also comprise: (a) a plurality of first particles comprising a polyalphaolefin drag reducing polymer; and (b) a plurality of second particles comprising a non-polyalphaolefin drag reducing polymer, wherein the non-polyalphaolefin drag reducing polymer is formed via emulsion polymerization.

These improved drag reducer compositions can be prepared by a process which comprises: (a) subjecting one or more monomers to bulk polymerization to thereby produce a first drag reducing polymer; (b) cryogrinding at least a portion of the first drag reducing polymer to thereby produce a plurality of first particles comprising at least a portion of the first drag reducing polymer; (c) subjecting one or more monomers to emulsion polymerization to thereby produce a plurality of second particles comprising a second drag reducing polymer, wherein at least a portion of the second particles are dispersed in a continuous phase; and (d) dispersing at least a portion of the first particles in the continuous phase. As used in this application, these improved drag reducers are generically referred to as "latex" drag reducers.

Figure 1:
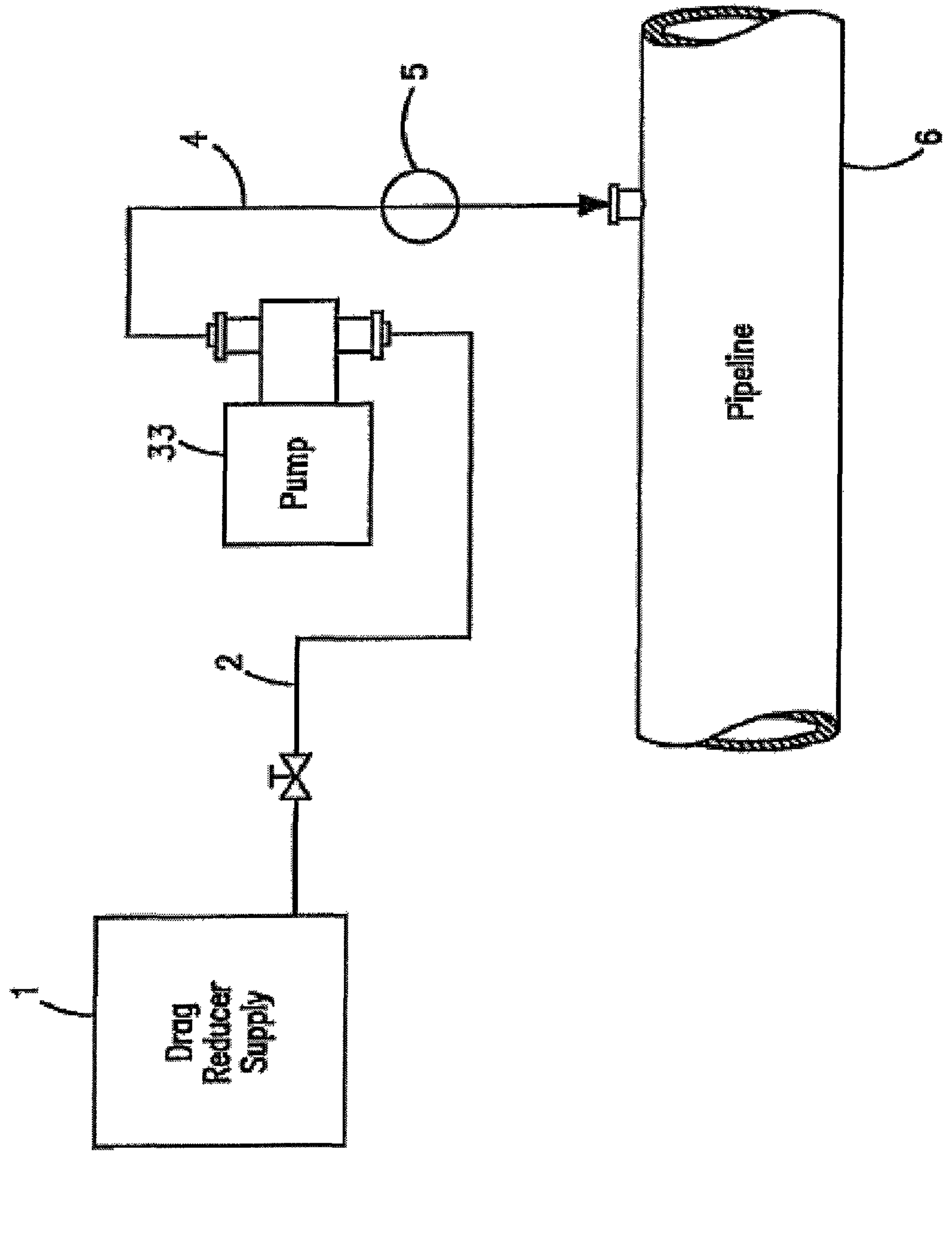
FIG. 1 is a schematic diagram of a drag reducer supply system to supply a transportation system, or pipeline.

Various embodiments of the present invention provide a diaphragm injection pump to inject drag reducer into a transportation system of pipeline. Other various embodiments of the present invention provide a diaphragm pump to transport or pump a latex. Referring initially to FIG. 1, the drag reducer supply 1 is fed through feed line 2, through diaphragm injection pump 33, pumped into injection line 4, though flow meter 5 into pipeline 6. Supply 1 also can be a latex.

Figure 2:
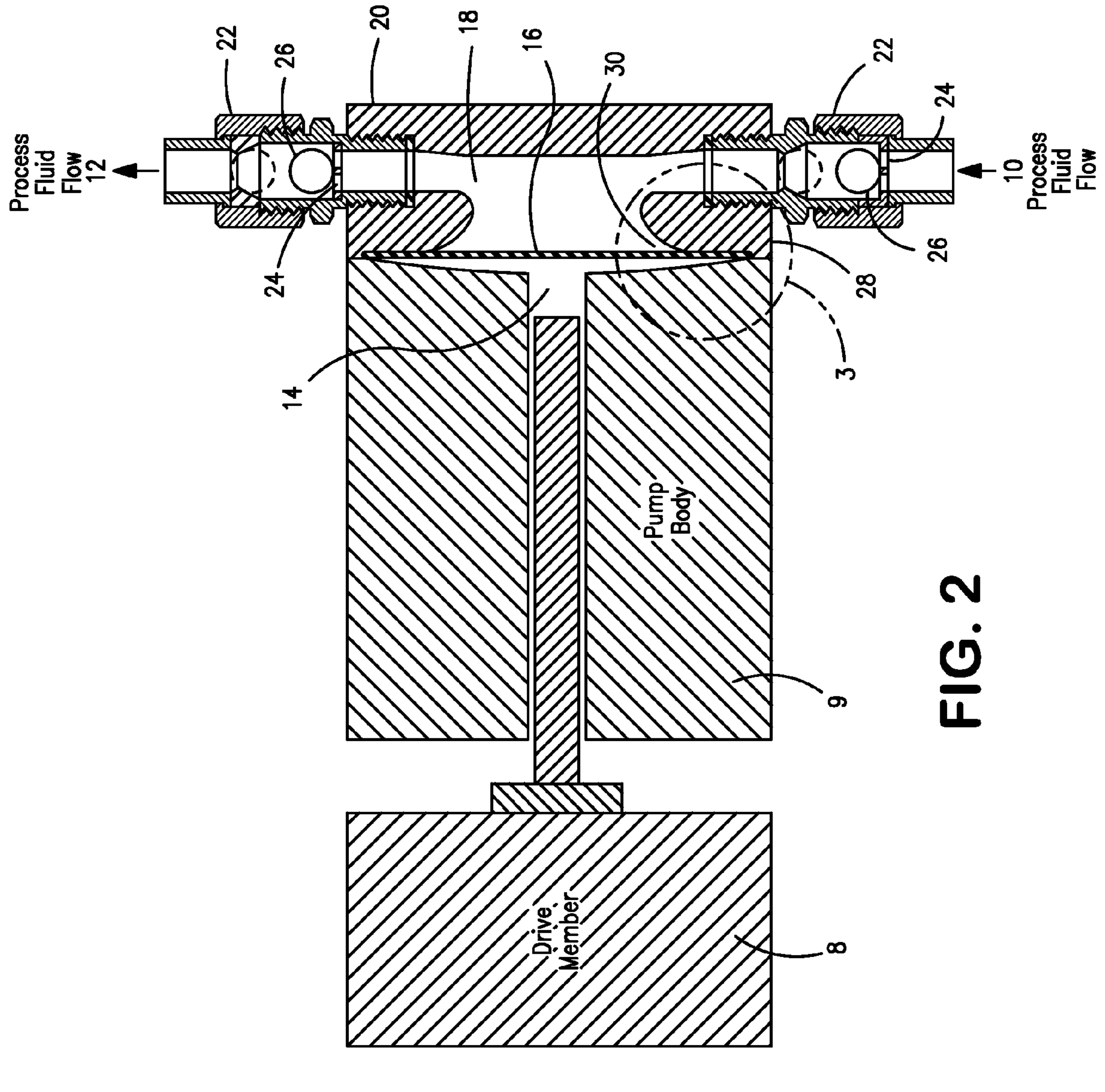
FIG. 2 is a schematic diagram of a diaphragm injection pump to inject drag reducers into a transportation system or pipeline.

FIG. 2 is a cross section of diaphragm injection pump 33, as illustrated in FIG. 1. Area 3 in FIG. 2 is enlarged in FIG. 3. The diaphragm injection pump has drive member 8 and pump body 9, with process fluid inlet flow 10 and process fluid outlet flow 12. The pump has an actuation side 14, a diaphragm 16, a process side pumping chamber 18, interior pump head 28, and an exterior pump head 20. Any fluid, if there is any such fluid, such as, for example, a pneumatic fluid or a hydraulic fluid, on the actuation side 14 does not penetrate diaphragm 16 and does not contact the process fluid in process side pumping chamber 18. The pump also has two check valves, each with a check valve cartridge 22, a check valve seat 24, and a check valve ball 26. Each diaphragm injection pump also has a pinch area 30, which is located between diaphragm 16 and interior pump head 28.

Figure 3:
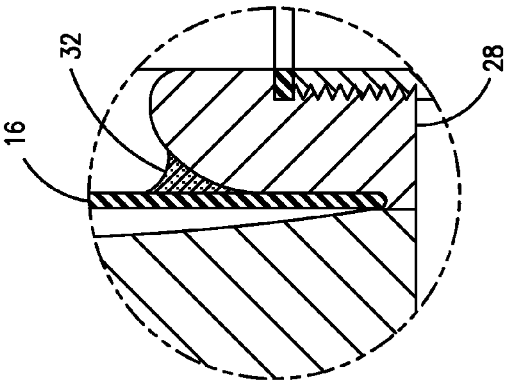
FIG. 3 is a schematic diagram of an enlargement of a portion of a diaphragm injection pump of FIG. 2.

Referring now to FIG. 3, diaphragm 16 and interior pump head 28 are shown with barrier material 32 inserted into pinch area 30.

Diaphragm injection pumps useful in the present invention can be any type of diaphragm injection pump which has a pinch area between the diaphragm and the pump head. Any type of actuation mechanism can be used with the diaphragm injection pump. If the actuation mechanism is mechanical, but hydraulic, any type of hydraulic fluid can be used with diaphragm injection pump; any size of piston can be used with diaphragm injection pump; any length of piston stroke can be used with diaphragm injection pump. Any type of check valve 22 can be used with the diaphragm injection pump, however, ball check valves are typically used with diaphragm injection pumps.

Diaphragms useful in the present invention can be any type of diaphragm, but are usually an elastomer or thermoplastic material such as, for example, Viton® and/or Teflon® materials. Metallic diaphragms also can be employed with the present invention. The pump head useful in the present invention can be made of any metal or plastic, but it is typically a metal for high pressure applications, such as, for example, drag reducer applications.

Any pump rate or pump volume can be used in the present invention. However, exemplary diaphragm injection pump capacities useful with drag reducing agents range from 1 gallon(s) per day (gpd) to about 1500 gpd or greater.

Exemplary diaphragm injection pumps include, but are not limited to, those made by Milton Roy Company, such as MACROY® pump and the MILROYAL® pumps.

Any type of elastomeric material can be used as barrier material 32 in the present invention. Exemplary elastomeric materials include, but are not limited to, natural rubber, polyurethane, ethylene propylene diene M-class rubber (EPDM), nitrile rubbers (NBR), VITON®, and mixtures of two or more thereof. However, preferred elastomeric materials are compatible with the latex and have good compressional fatigue resistance.

The amount of barrier material used in the diaphragm injection pump can be any amount sufficient to just block the pinch area and not create a new pinch area. Preferred barrier materials can decompress slightly as the diaphragm flexes to allow the barrier material to fill the pinch area and not create new pinch areas. Usually enough barrier material is used so that the latex is prevented from contacting at least 50 percent, preferably 75 percent, and most preferably 85 percent, of the circumferential interface between said pump side of said diaphragm and said pump head.

EXAMPLES

The following examples illustrate the effectiveness of the inventive apparatus and methods for transporting at least a portion of a latex drag reducer through a diaphragm pump and for reducing the pressure drop associated with flowing a hydrocarbon-containing fluid through a pipeline.

All of the following pump tests consisted of using a High Performance Diaphragm (HPD) Liquid End MILROYAL® C injection pump to pump latex flow improver to simulate an injection scenario into a pipeline. The latex flow improver product was gravity fed to the injection pump and was pumped through a mass flow meter at a pump stroke length setting of 50% with a plunger speed of 85 strokes per minutes. From there, the latex flow improver product went through 3000 feet of ½" 316 stainless steel tubing (wall thickness 0.049") where it was recycled back to the feed tote. Upstream of the tubing was a 100 micron filter to minimize the chances for the long length of line to become restricted or plugged. The purpose of the long length of tubing was to provide low shear back pressure on the pump to simulate injection into a pipeline. The back pressure on the pump was generally between 500 and 1000 psig depending on the product temperature. Tests were performed at ambient conditions, in which the temperature ranges from 45° F. in the winter to 105° F. in the summer. The flow rate was logged with a datalogger and a plot of flow rate versus time was created. When the test was ended, the pump head was dismantled and examined for deposits, cleaned up, and then re-assembled.

For barrier material tests, the barrier material was applied to the edge of the diaphragm that corresponded to the pinch area. The barrier material was applied in a manner similar to apply caulk on a bath tub or sink. The diaphragm, with a circumferential bead of barrier material, was pressed in place by hand onto the pump head and then the pump head and diaphragm were re-assembled to the hydraulic end of the pump. The bolts on the pump head were tightened down causing the barrier material to compress and squeeze the material into the pinch area. The barrier material was allowed to cure inside the pump head at ambient temperatures and pressures for several days at which point in time the pump check valves were installed and the tubing fittings put together to begin the pump test.

The drag reducer (Latex A) used in the following examples was prepared by emulsion polymerization employing the following procedure. Polymerization was performed in a 185-gallon stainless steel, jacketed reactor with a mechanical stirrer, thermocouple, feed ports, and nitrogen inlets/outlets. The reactor was charged with 400 lbs of monomer (2-ethylhexyl methacrylate), 284.9 lbs of de-ionized water, 198.7 lbs of ethylene glycol, 27.6 lbs of POLYSTEP® B-5 (surfactant, available from Stepan Company of Northfield, Ill.), 40.0 lbs of TERGITOL® 15-S-7, 1.13 lbs of potassium phosphate monobasic (pH buffer), 0.88 lbs of potassium phosphate dibasic (pH buffer), and 30.2 grams of ammonium persulfate, $(NH_4)_2S_2O_8$ (oxidizer).

The monomer and water mixture was agitated at 110 rpm while being purged with nitrogen to remove any traces of oxygen in the reactor and was cooled to about 41° F. The two surfactants were added and the agitation was slowed down to 80 rpm for the remainder of the batch. The buffers and the oxidizer were then added. The polymerization reaction was initiated by adding into the reactor 7.32 grams of ammonium iron (II) sulfate, $Fe(NH_4)_2(SO_4)_2.6H_2O$ in a solution of 0.010 M sulfuric acid solution in DI water at a concentration of 1,017 ppm at a rate of 10 g/min. The solution was injected for 10 hours to complete the polymerization. The resulting latex was pressured out of the reactor through a 5-micron bag filter and stored.

The resulting drag reducer was a latex, containing poly(2-ethylhexyl methacrylate) as the active ingredient. The sample had a solids content of 45.0 percent by mass and a nominal polymer content of 40 percent. The density of the sample was 1.028 g/mL. The continuous phase was 60% water and 40% ethylene glycol, by mass.

Example 1

No Barrier Material Test

Figure 4:
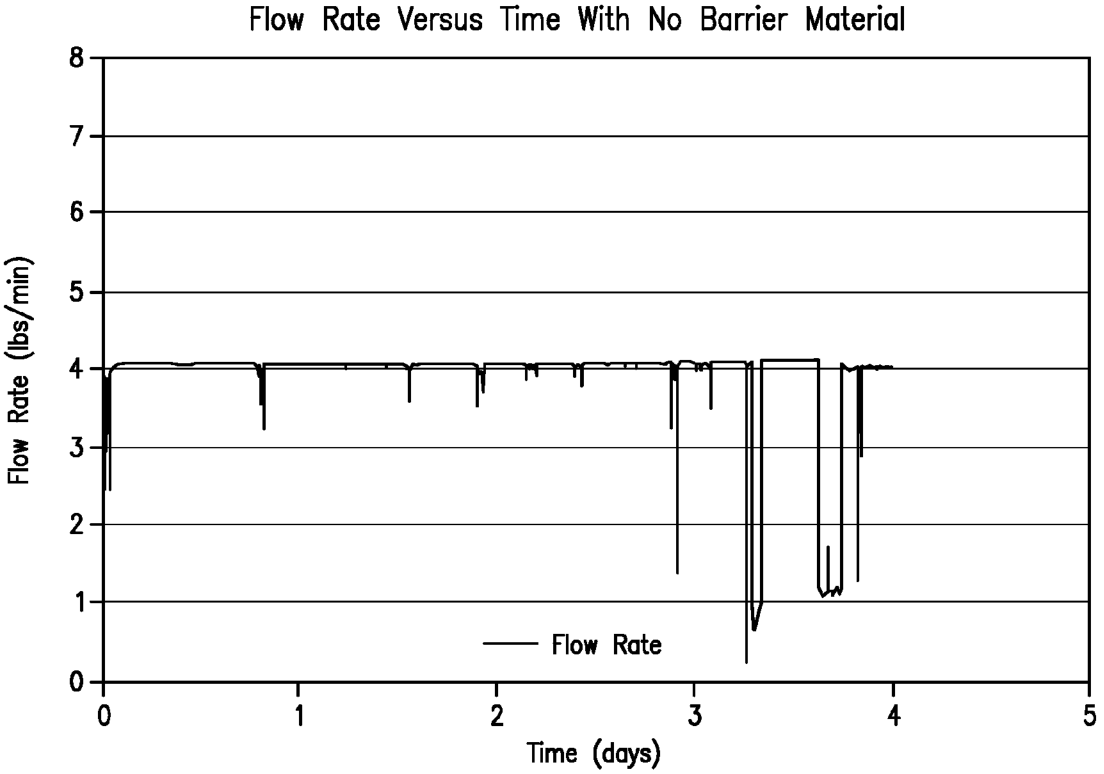
FIG. 4 is a plot of flow rate versus time, with no barrier material used in the diaphragm injection pump.

This Example demonstrates pumping Latex A through an HPD pump with no barrier material. The results, shown in FIG. 4, show numerous large and sudden decreases in pumping rate which are indication that the pump discharge check valve is being plugged or partially blocked. The pump test was stopped after about four days to examine the solids. These "blips" in rate were as short as a couple of minutes to as long as a few hours. Upon dismantling the pump head, a visual inspection of the pump head showed a significant amount of polymer film on the diaphragm. This film appeared to be breaking off the pump head and moving through the discharge check valve.

Example 2

Polyurethane Barrier Material Test

Figure 5:
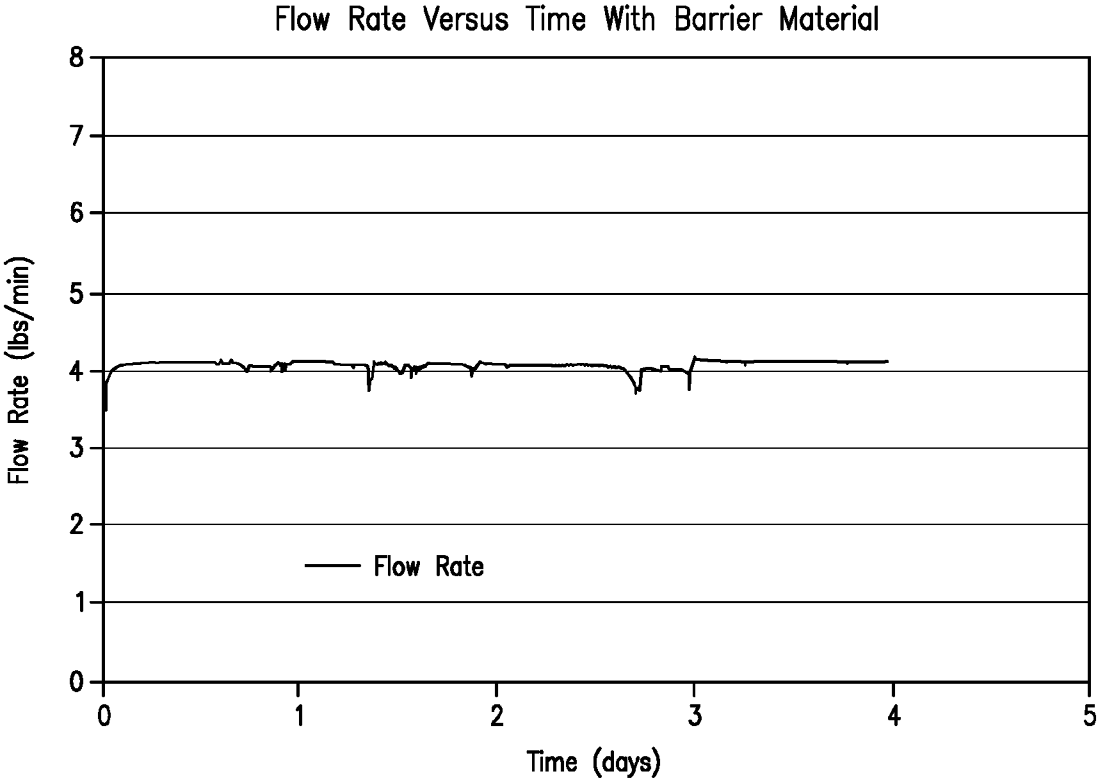
FIG. 5 is a plot of flow rate versus time, with barrier material used in the diaphragm injection pump.

This Example demonstrates pumping Latex A through an HPD pump with PL® Polyurethane Door, Window and Siding Sealant, marketed by Henkel Corporation as the barrier material. The results, shown in FIG. 5, show improved pumping stability. The pump test was stopped after about four days to examine the solids. A visual inspection showed polymer film had formed on the barrier material in locations where the barrier material came loose from the pump head, but there was minimal amount of solids present where the barrier material was still in contact with the pump head.

Example 3

Glued-On Polyurethane Barrier Material Test

Figure 6:
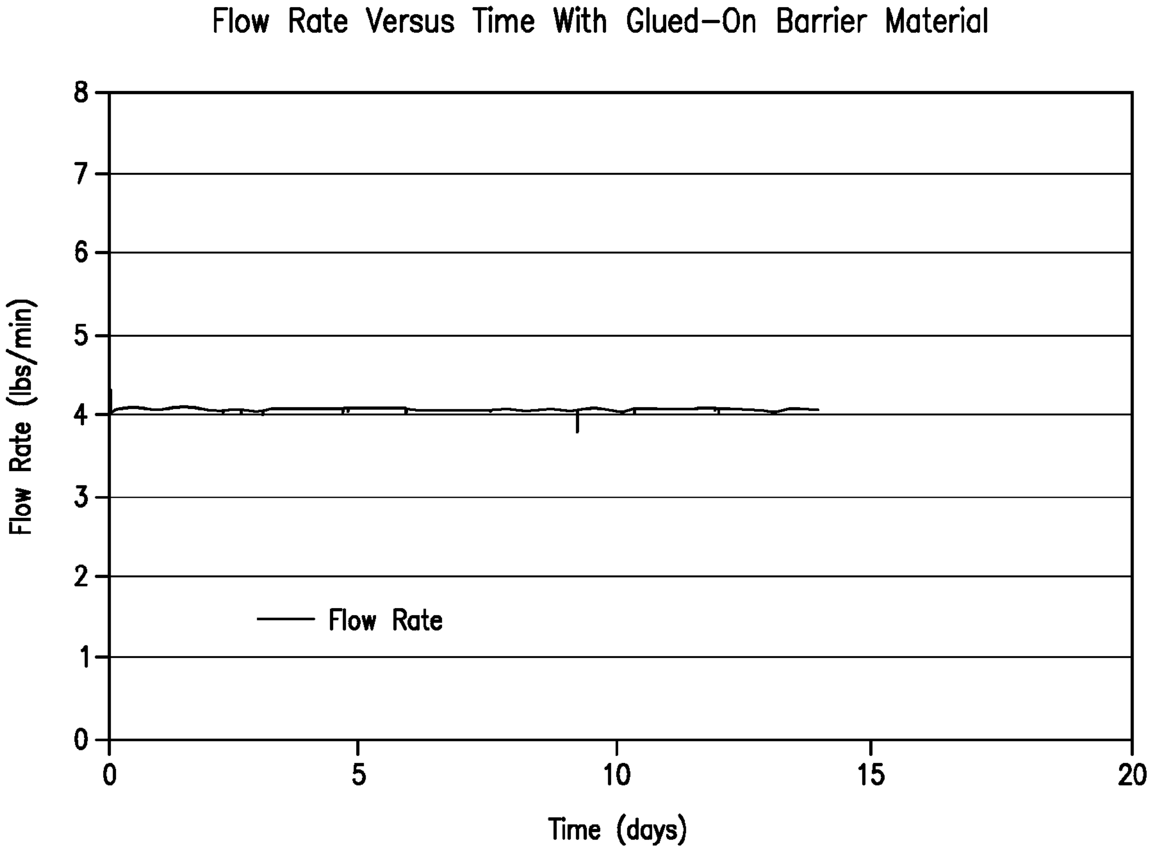
FIG. 6 is a plot of flow rate versus time, with a glued-on barrier material used in the diaphragm injection pump.

A test similar to Example 2 was repeated in which the PL® Polyurethane Door, Window and Siding Sealant, marketed by Henkel Corporation, was allowed to cure in place in the pump head and then was removed and glued, with Elmer's E617® super glue gel, to the metal pump head to be able to hold it in place better. The results, shown in FIG. 6, show a nice smooth flow rate plot for 14 days. The pump test was stopped at that time to examine the solids. A visual inspection showed that polymer solids developed in the pump head but they were only present where the barrier material came loose from the pump head.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

That which is claimed:

1. A diaphragm pump comprising:

a) a diaphragm having a pump side and an actuation side;

b) a pump head circumferentially coupled to said pump side of said diaphragm thereby defining an angle of intersection along a resulting circumferential interface;

c) a pumping chamber defined by said pump head and said pump side of said diaphragm; and d) at least one barrier material disposed within said pumping chamber, wherein during operation of said diaphragm pump, said diaphragm is caused to oscillate between a suction stroke position and a discharge stroke position thereby causing a process fluid to flow through said pumping chamber, wherein said oscillation further causes the angle of intersection along said circumferential interface to expand and contract, wherein said barrier material substantially prevents said process fluid from contacting said circumferential interface during said expansion;

and wherein said barrier material is an annular ring with a triangular like cross section comprising a first hypotenuse like side contacting the pump head, a second side contacting the diaphragm and a third side facing the pump chamber.

2. The diaphragm pump of claim 1 wherein said process fluid is a latex.

3. The diaphragm pump of claim 1 wherein at least a portion of said process fluid is a latex drag reducer.

4. The diaphragm pump of claim 1 wherein said process fluid is a latex drag reducer.

5. The diaphragm pump of claim 1 wherein said process fluid is an emulsion polymerized latex drag reducer.

6. The diaphragm pump of claim 1 wherein said barrier material is an elastomeric material.

7. The diaphragm pump of claim 1 wherein said barrier material is an elastic material selected from the group consisting of natural rubber, polyurethane, ethylene propylene diene M-class rubber (EPDM), nitrile rubbers (NBR), and mixtures of two or more thereof.

8. A method for transporting a latex drag reducer, said method comprising pumping at least a portion of said latex drag reducer through a diaphragm pump, said diaphragm pump comprising:

a) a diaphragm having a pump side and an actuation side; and b) a pump head circumferentially coupled to said pump side of said diaphragm, thereby defining a pumping chamber, wherein said pumping comprises causing said diaphragm to oscillate between a suction stroke position and a discharge stroke position thereby causing said latex drag reducer to flow through said pumping chamber, wherein said latex drag reducer is prevented from contacting at least 50 percent of a circumferential interface between said pump side of said diaphragm and said pump head by at least one barrier material;

and wherein said barrier material is an annular ring with a triangular like cross section comprising a first hypotenuse like side contacting the pump head, a second side contacting the diaphragm and a third side facing the pump chamber.

9. The method of claim 8 wherein said latex drag reducer is an emulsion polymerized latex drag reducer.

10. The method of claim 8 wherein said barrier material is an elastomeric material.

11. The method of claim 8 wherein said barrier material is an elastic material selected from the group consisting of natural rubber, polyurethane, ethylene propylene diene M-class rubber (EPDM), nitrile rubbers (NBR), and mixtures of two or more thereof.

12. A method for reducing a pressure drop associated with flowing a hydrocarbon-containing fluid through a pipeline, said process comprising:

a) preparing a latex drag reducer via emulsion polymerization; and b) pumping at least a portion of said latex drag reducer into said hydrocarbon-containing fluid via a diaphragm pump, said diaphragm pump comprising:

1) a diaphragm having a pump side and an actuation side; and 2) a pump head circumferentially coupled to said pump side of said diaphragm, thereby defining a pumping chamber, wherein said pumping comprises causing said diaphragm to oscillate between a suction stroke position and a discharge stroke position thereby causing said latex drag reducer to flow through said pumping chamber, wherein said latex drag reducer is prevented from contacting at least 50 percent of a circumferential interface between said pump side of said diaphragm and said pump head by at least one barrier material;

and wherein said barrier material is an annular ring with a triangular like cross section comprising a first hypotenuse like side contacting the pump head, a second side contacting the diaphragm and a third side facing the pump chamber.

13. The method of claim 12 wherein said latex drag reducer further comprises a non-latex drag reducer component.

14. The method of claim 12 wherein said barrier material is an elastomeric material.

15. The method of claim 12 wherein said barrier material is an elastic material selected from the group consisting of natural rubber, polyurethane, ethylene propylene diene M-class rubber (EPDM), nitrile rubbers (NBR), and mixtures of two or more thereof.

16. The method of claim 12 wherein said latex drag reducer is prevented from contacting at least 75 percent of the circumferential interface between said pump side of said diaphragm and said pump head by said barrier material.

* * * * *